Patented Apr. 2, 1935

1,996,630

UNITED STATES PATENT OFFICE 1,996,630

ALKYL-SUBSTITUTED-HEXYL ETHYL BARBITURIC ACID

Horace A. Shonle, Indianapolis, Ind., assignor to Eli Lilly and Company, Indianapolis, Ind., a corporation of Indiana No Drawing. Application February 26, 1934, Serial No. 713,020

8 Claims. (Cl. 260—33)

It is the main object of my invention to produce certain 5,5-di-aliphatic-substituted barbituric acids, and their salts, in which one substituent is the ethyl group, and the other substituent is a saturated branched-chain primary aliphatic radical having a straight chain containing 6 carbon atoms with an ethyl substituent on the number 2 carbon atom, and if desired with a methyl substituent on one of the numbers 3, 4, and 5 carbon atoms. The second substituent may thus be any of the following:

a. 2-ethyl-hexyl

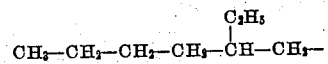

b. 2-ethyl-3-methyl-hexyl

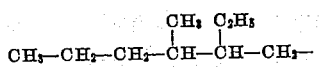

c. 2-ethyl-4-methyl-hexyl

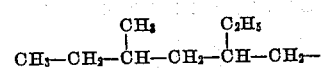

d. 2-ethyl-5-methyl-hexyl

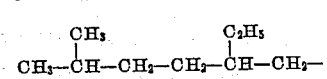

An incidental object of my invention is to produce certain new intermediates. These are di-aliphatic-substituted malonic esters.

The new 5,5-di-aliphatic-substituted barbituric acids and their salts which are included in this present application all have hypnotic action. They are all represented by the following formula:

(1) 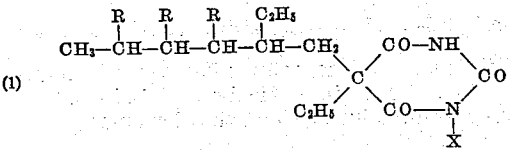

in which R in at least two of the three places represents hydrogen and in the third place represents either hydrogen or a methyl group; and X represents either hydrogen (if the compound is an acid), or (if the compound is a salt) either an alkali metal, such as sodium, or ammonium, or a mono- or di-alkyl ammonium radical, such as $-NH_3-CH_3$ or $-NH_2(C_2H_5)_2$.

These new acids and salts are prepared from certain new di-substituted malonic esters, usually ethyl esters, which are represented by the following formula:

(2) 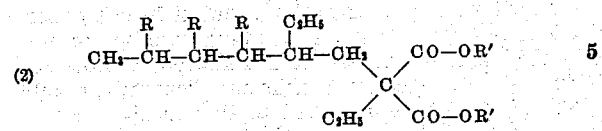

in which R has the same significance as before; and R′ represents an alkyl radical having not to exceed 3 carbon atoms, namely the methyl, ethyl, and propyl radicals, and preferably the ethyl radical. Because of this preference, in making these substituted malonic esters I prefer to work with the di-ethyl malonates; and so whenever I refer to a malonic ester, substituted or unsubstituted, I mean the di-ethyl malonate unless otherwise indicated.

In describing the various examples illustrative of my invention, I shall describe first the malonic esters, then the barbituric acids, and then the barbiturates; and the procedures for respectively producing them.

Malonic esters

In making the respective malonic esters, I use saturated branched-chain primary aliphatic alcohols having a straight chain containing 6 carbon atoms with an ethyl substituent on the number 2 carbon atom, and if desired with a methyl substituent on one of the numbers 3, 4, and 5 carbon atoms. These include the following:

a. 2-ethyl-hexanol-1
b. 2-ethyl-3-methyl-hexanol-1
c. 2-ethyl-4-methyl-hexanol-1
d. 2-ethyl-5-methyl-hexanol-1

Alcohol a is a commercially available product. Alcohols b, c, and d may be prepared according to the method described by Connor and Adkins, Journal American Chemical Society, volume 54, pages 4678–4690, for the year 1932. This article specifically describes alcohols b and d on pages 4681 and 4689; and while it does not describe alcohol c, that alcohol can be made by the same procedure.

In using these alcohols to make the malonic esters, I proceed as follows:

First I obtain the corresponding bromide from the alcohol. This may be done in any of the known ways, as by treating the respective alcohol with $PBr_3$, with aqueous HBr, or with anhydrous gaseous HBr.

Examples of the bromides thus obtained are the following:

1-bromo-2-ethyl-hexane
1-bromo-2-ethyl-3-methyl-hexane
1-bromo-2-ethyl-5-methyl-hexane These are purified by fractional distillation. The fractions which I used for the further synthesis were those which at 20° C. had refractive indexes of 1.4537 to 1.4547, 1.4611 to 1.4622, and 1.4552 to 1.4557, respectively.

The respective malonic esters are prepared from these bromides. One mole of sodium is dissolved in from 10 to 12 times its weight of absolute alcohol, under a reflux condenser. One mole of ethyl malonic ester (ethyl di-ethyl-malonate) is then added. Desirably most of the alcohol that was used to dissolve the sodium is then removed, as by vacuum distillation. Then about 1.1 moles of the respective bromide, produced as above described, is gradually added. The mixture is refluxed for some hours, until it no longer shows an alkaline reaction to moist litmus paper. Most of the alcohol remaining, whether or not some had previously been removed, is now removed by vacuum distillation, leaving an oily residue. Water is added to this residue to dissolve out the sodium bromide present in it; and the oily layer, which is the desired di-substituted malonic ester, is separated and dried. This di-substituted malonic ester is purified by fractional distillation in vacuo. When so purified it is a colorless or pale yellow liquid in all the cases named.

The malonic esters which are obtained from the bromides given above as examples are the following:

*2-ethyl-hexyl ethyl malonic ester*

This has a boiling point of about 128°–129° C., at about 3.5 mm. pressure; and is represented by the following formula:

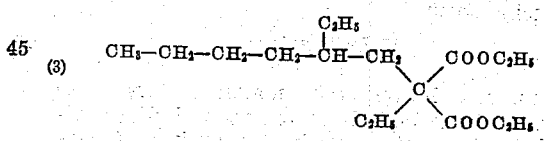

*2-ethyl-3-methyl-hexyl ethyl malonic ester*

This has a boiling point of about 120°–123° C., at about 2.5 mm. pressure; and is represented by the following formula:

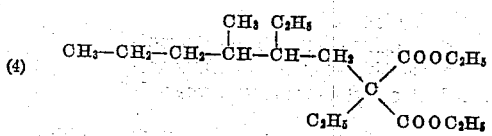

*2-ethyl-5-methyl-hexyl ethyl malonic ester*

This has a boiling point of about 135°–140° C., at about 2 mm. pressure; and is represented by the following formula:

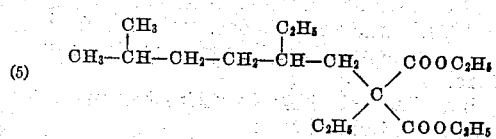

BARBITURIC ACIDS

Di-substituted barbituric acids corresponding to the various di-substituted malonic esters above described may be obtained from such esters. These barbituric acids are represented by the following general formula:

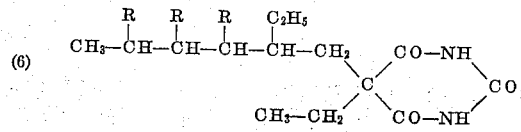

in which R has the same significance as before.

In general, the method of preparing such di-substituted barbituric acids is as follows:

Three moles of sodium are dissolved in 10 to 12 times its weight of absolute alcohol under a reflux condenser. To this are added about 1.6 moles of urea and 1 mole of the di-substituted malonic ester of which the corresponding barbituric acid is desired. The mixture is gently refluxed for 12 to 15 hours, after which most of the alcohol is removed by vacuum distillation. The residue is dissolved in water, and a sufficient amount of a dilute acid, such as hydrochloric acid, is added to completely throw out of solution the di-substituted barbituric acid which has been formed. This di-substituted barbituric acid comes out of solution in some cases as a solid, and in some cases as an oily liquid which solidifies on standing. The di-substituted barbituric acid so obtained is separated, as by filtration; is then dried, and washed with gasoline; and is then purified by recrystallization from dilute alcohol. The barbituric acids thus obtained are all white crystalline solids; are insoluble in water, and readily soluble in alcohol and ether; are bitter-tasting; and have hypnotic action.

The di-substituted barbituric acids which are obtained from the malonic esters given as examples are the following:

*2-ethyl-hexyl ethyl barbituric acid*

This has a melting point, after several recrystallizations from dilute alcohol, of 116°–117° C. It is represented by the following formula:

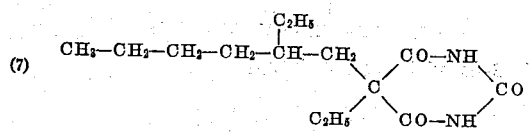

*2-ethyl-3-methyl-hexyl ethyl barbituric acid*

This has a melting point, after several recrystallizations from dilute alcohol, of 151°–154° C. It is represented by the following formula:

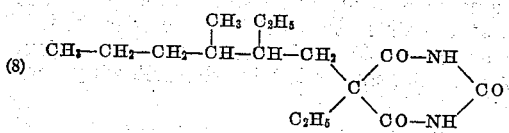

*2-ethyl-5-methyl-hexyl ethyl barbituric acid*

This has a melting point, after several recrystallizations from dilute alcohol, of 134°–136° C. It is represented by the following formula:

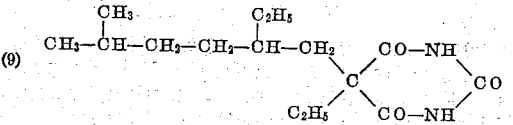

The temperatures given were all obtained with a short-stem Anschütz thermometer.

BARBITURATES

All the above-described barbituric acids are soluble in solutions of alkali-metal hydroxides and ethylates, to form the corresponding alkali-metal barbiturates in solution. The solid salts may be obtained from such solutions.

The new di-aliphatic-substituted barbiturates, which may all be represented by Formula 1 with X representing a metal or ammonium or a mono- or di-alkyl ammonium radical, can perhaps best be prepared from the corresponding di-aliphatic-substituted barbituric acids, as by reaction in a suitable solvent with either the hydroxide or the ethylate of the desired inorganic base, or with ammonia, or with the desired alkyl amine. For instance:

A. *Alkali-metal salts.*—The sodium salts of these di-substituted barbituric acids are all represented by the following general formula:

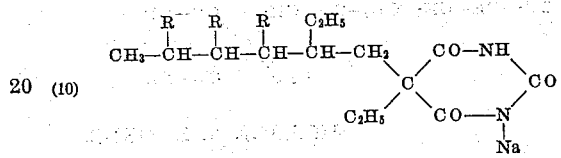
(10)

in which R has the same significance as before. The other alkali-metal salts have the same general formula, except for the substitution of the other metal for sodium. These salts are prepared as follows:

A solution of one molar proportion of the hydroxide or the ethylate of the alkali metal, such as sodium, is added to a suspension or solution in a suitable solvent (such as alcohol) of one molar proportion of any of the herein-contemplated 5,5-di-aliphatic-substituted barbituric acids; which produces the desired barbiturate in solution. The amount of solvent used is desirably sufficient to dissolve the salt thus produced. The solution is filtered; and is then evaporated, preferably under vacuum at a low temperature, until the salt is obtained in solid form.

The sodium salts of the di-substituted barbituric acids given as examples are the following:

Sodium 2-ethyl-hexyl ethyl barbiturate, which has the following formula:

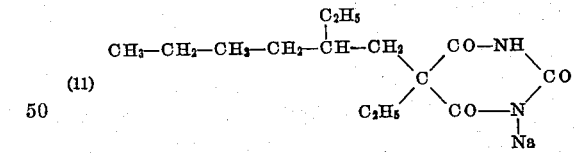
(11)

Sodium 2-ethyl-3-methyl-hexyl ethyl barbiturate, which has the following formula:

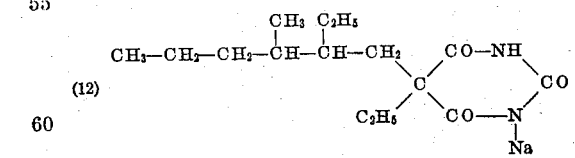
(12)

Sodium 2-ethyl-5-methyl-hexyl ethyl barbiturate, which has the following formula:

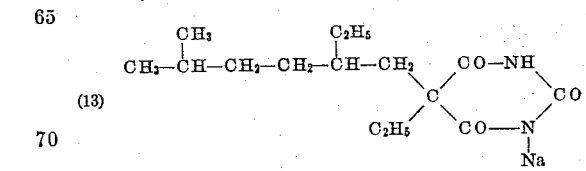
(13)

These sodium salts are all white solids, soluble in water and alcohol, and insoluble in ether. They are all bitter-tasting, and their aqueous solutions are alkaline in reaction. They all have hypnotic properties, on both oral and parenteral administration. When these salts are desired in stable form sufficiently free from contaminants so that clear water solutions thereof suitable for intravenous injection may be obtained, they may be so obtained by the method set forth in my Patent No. 1,856,792, granted May 3, 1932.

B. *Ammonium and alkyl-amine salts.*—One molar proportion of any of the above-described 5,5-di-aliphatic-substituted barbituric acids is dissolved in or added to somewhat more than a molar proportion of an aqueous or alcoholic solution of concentrated ammonia or of the alkyl amine, such for instance as mono- or di-methyl amine or mono- or di-ethyl amine. The amount of liquid used should be sufficient to ensure complete reaction. The resulting barbiturate crystallizes out or is concentrated to solid form. The formulas of these barbiturates correspond in general to Formulas 11 to 13 inclusive, save that $NH_4$ is substituted for Na in the case of the ammonium salts, or the proper alkyl-ammonium radical, such for instance as the methyl-ammonium radical ($-NH_3-CH_3$), is substituted for Na in the case of the alkyl-amine salts.

The above-described di-aliphatic-substituted barbituric acids and their salts are all of value as sedatives and hypnotics.

I claim as my invention:

1. A barbituric compound which is represented by the following formula:

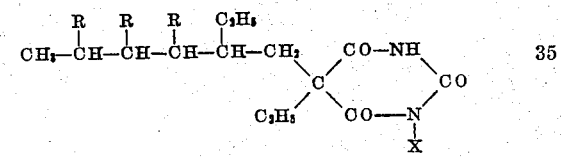

in which R in at least two of the three places represents hydrogen and in the third place represents either hydrogen or a methyl group; and X represents either hydrogen, an alkali metal, ammonium, or a mono- or di-alkyl ammonium radical.

2. A barbituric acid which is represented by the following formula:

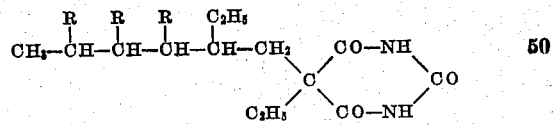

in which R in at least two of the three places represents hydrogen and in the third place represents either hydrogen or a methyl group.

3. A 2-ethyl-hexyl ethyl barbituric compound which is represented by the following formula:

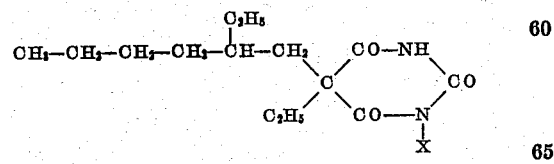

in which X represents either hydrogen, an alkali metal, ammonium, or a mono- or di-alkyl ammonium radical.

4. 2-ethyl-hexyl ethyl barbituric acid, which is represented by the following formula:

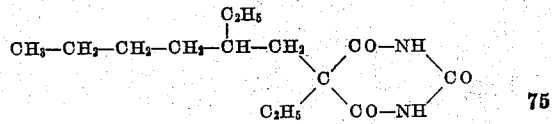

5. A 2-ethyl-3-methyl-hexyl ethyl barbituric compound which is represented by the following formula:

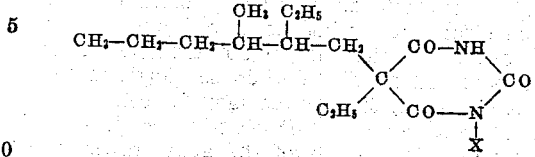

in which X represents either hydrogen, an alkali metal, ammonium, or a mono- or di-alkyl ammonium radical.

6. 2-ethyl-3-methyl-hexyl ethyl barbituric acid, which is represented by the following formula:

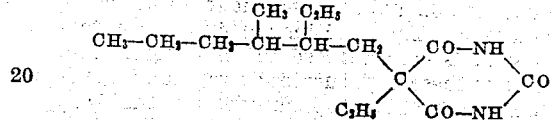

7. A 2-ethyl-5-methyl-hexyl ethyl barbituric compound which is represented by the following formula:

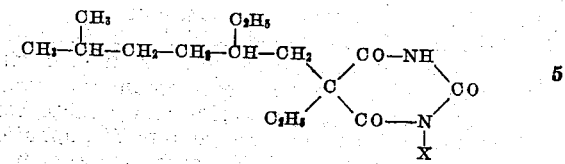

in which X represents either hydrogen, an alkali metal, ammonium, or a mono- or di-alkyl ammonium radical.

8. 2-ethyl-5-methyl-hexyl ethyl barbituric acid, which is represented by the following formula:

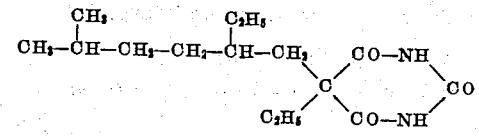

HORACE A. SHONLE.